United States Patent [19]

Schonfeld

[11] 4,046,743

[45] Sept. 6, 1977

[54] CATALYSIS OF AMINE CURABLE POLYMERS BY HIGH DIELECTRIC CONSTANT COMPOUNDS

[75] Inventor: Steven Edward Schonfeld, Akron, Ohio

[73] Assignee: The Firestone Tire & Rubber Company, Akron, Ohio

[21] Appl. No.: 597,808

[22] Filed: July 21, 1975

Related U.S. Application Data

[63] Continuation-in-part of Ser. No. 496,504, Aug. 12, 1974, abandoned, which is a continuation-in-part of Ser. No. 476,369, June 5, 1974, abandoned.

[51] Int. Cl.$^2$ .............................................. C08G 18/18
[52] U.S. Cl. ..................... 260/77.5 AB; 260/77.5 AC
[58] Field of Search ............. 260/77.5 AM, 77.5 AC, 260/2.5 AC, 30.8 DS, 77.5 AB, 2.5 AB

[56] References Cited

U.S. PATENT DOCUMENTS

| | | | |
|---|---|---|---|
| 3,706,821 | 12/1972 | Anderson et al. | 260/45.95 |
| 3,755,261 | 8/1973 | Van Gulick | 260/77.5 AM |
| 3,888,831 | 6/1975 | Kogon | 260/77.5 AM |
| 3,891,606 | 6/1975 | Kogon | 260/77.5 AM |
| 3,897,396 | 7/1975 | Ishii et al. | 260/77.5 AM X |

*Primary Examiner*—Lewis T. Jacobs

[57] ABSTRACT

Amine curable polymers or prepolymers such as urethanes are cured by the use of a methylene dianiline complex or a racemic 2,3-di(4-aminophenyl) butane complex in the presence of a high dielectric constant catalytic compound which is relatively non-reactive with amines and isocyanates and exclusive of halogen containing foaming agents, halogen containing acids, and halogen containing flame retardants, so that increased cure rates, decreased cure temperatures or both are readily obtained.

11 Claims, 1 Drawing Figure

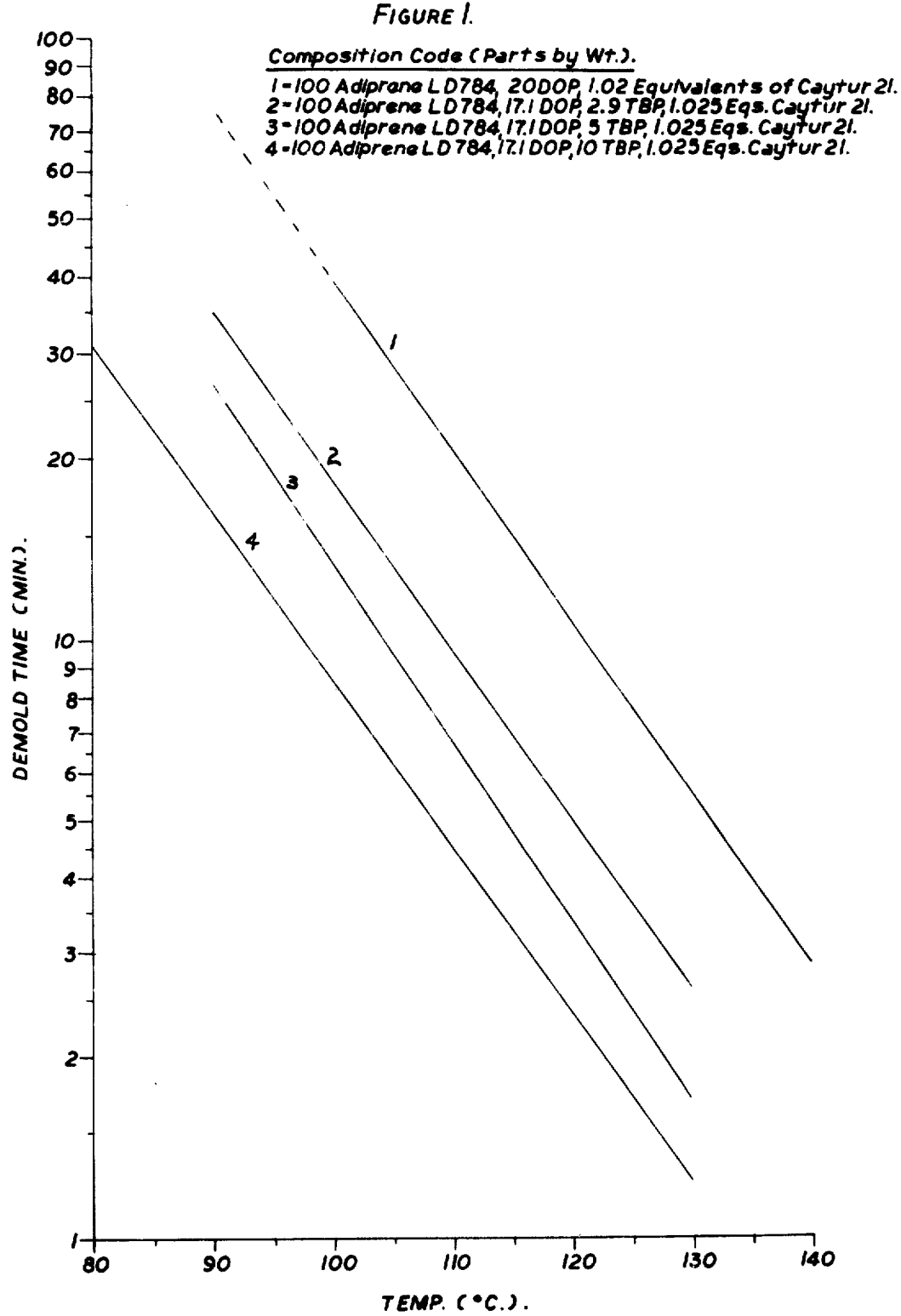

CATALYSIS OF AMINE CURABLE POLYMERS BY HIGH DIELECTRIC CONSTANT COMPOUNDS

CROSS REFERENCE

The present application is a continuation-in-part of U.S. Application "Tributyl Phosphate Catalysis of Amine Curable Polymers" bearing U.S. Ser. No. 496,504, filed Aug. 12, 1974, now abandoned, which in turn is a continuation-in-part of a patent application bearing U.S. Ser. No. 476,369, filed on June 5, 1974, now abandoned.

BACKGROUND OF THE INVENTION

The present invention relates to the catalyzation of methylene dianiline complexes utilized in the curing of amine curable polymers and particularly polyurethane polymers so that cure proceeds rapidly and at reasonably low temperatures.

Heretofore, the curing of amine curable polymers or prepolymers such as epoxy resins, millable halogen containing hydrocarbon polymers and particularly isocyanate terminated polyurethane prepolymers have generally involved the blending of an amine curing agent, forming of the resulting mixture into a useful form and heating to complete the curing reaction. However, a problem generally encountered by this procedure was the premature reaction of the curing agent with the curable polymer during the mixing and formation operations. This problem was particularly acute in highly reactive systems such as in the curing of isocyanate terminated polyurethane prepolymers which necessitated the use of special low residence time mixers and selected diamine curing agents having reduced reactivity which generally limited the physical properties of the vulcanizates.

A class of widely used curing agents which have overcome many of the above-noted problems are the complexes of methylene dianiline and a salt which upon heating generally in excess of temperatures of 100° C liberated the methylene dianiline from the complex and allowed it to commence curing of the polymers (U.S. Pat. No. 3,755,261). Although an improvement in the art, such class of curing agents still tended to be time consuming, required undesirable demolding time and thus tended to be uneconomical due to the number of molds required. The only way to overcome these disadvantages was to increase the cure temperature which resulted, of course, in an increased cure rate. However, increased cure temperatures caused larger thermal expansion and subsequent shrinkage in the molded article which often led to strains and cracks in the product.

SUMMARY OF THE INVENTION

Accordingly, it is an object of the present invention to provide catalytic compounds for a methylene dianiline complex or a racemic 2,3-di(4-aminophenyl) butane complex curing agent used in the curing of amine curable polymers or prepolymers.

It is another object of the present invention to provide a catalyst for a curing agent, as above, used in the production of polyurethane polymers.

It is a further object of the present invention to provide a catalyst for a curing agent, as above, which increases the cure rate, decreases the curing temperature or both.

It is also an object of the present invention to provide a catalyst for a curing agent, as above, wherein said catalytic compounds have a high dielectric constant and are relatively nonreactive with amines or isocyantes.

It is also a further object of the present invention to provide a catalyst for a curing agent, as above, wherein said catalytic compounds are exclusive of halogen containing foaming agents, halogen containing acids and halogen containing flame retardants.

It is still another object of the present invention to provide catalyst for a curing agent, as above, which reduces the demold time and cost of operation.

It is a still further object of the present invention to provide a catalyst for a curing agent, as above, which reduces shrinkage and strain in the polymer.

It is still also an object of the present invention to provide a catalyst for a curing agent used in the cure of amine curable polymers or prepolymers which causes polymerization to proceed rapidly at reasonably low temperatures and at temperatures lower than normally otherwise possible.

These and other objects of the present invention will become apparent from the following specification which describes in detail various embodiments without attempting to discuss all of the modifications in which the invention might be embodied; the invention being measured by the appended claims and not by the details of the specification.

In general, a catalyst cured polymer comprises by weight 100 parts of an amine curable polymer or prepolymer selected from the group consisting of urethanes containing free isocyanate groups, epoxy resins, polymers containing acid halide and haloformate groups, and polymers containing anhydride groups which on reaction with diamines, yield amide-acid linkages, from 0.8 to 1.2 equivalents of a curing agent based on the free active groups of said amine curable polymers or prepolymer, said curing agent selected from the group consisting of a complex of 4,4'-methylene dianiline and a salt, said salt selected from the group consisting of sodium chloride, sodium bromide, sodium iodide, sodium nitrate, lithium chloride lithium bromide, lithium iodide, lithium nitrite and sodium cyanide, and a complex of racemic 2,3-di(4-aminophenyl) butane and a salt, said salt selected from the group consisting of sodium chloride, sodium bromide, sodium iodide, potassium chloride, potassium bromide, potassium iodide, rubidium chloride, rubidium bromide, rubidium iodide, cesium chloride, cesium bromide and cesium iodide, the ratio of said dianiline or said butane to said complex being about 3 moles per 1 mole, and from 0.1 to about 35 parts of a catalytic compound having a high dielectric constant and a relatively slow reaction rate with said amines of said curing agent and said free active groups of said amine curable polymer or prepolymer. Additionally, a catalyst cured polymer composition or prepolymer selected from the group consisting of halogen containing hydrocarbon polymers, chloro sulfonated polymers and organo-poly siloxanes, and from 0.005 to about 0.05 equivalents of a curing agent based upon the active groups of said amine curable polymer wherein said curing agent is the same as immediately above and which composition also contains from 0.1 to about 35 parts of a catalytic compound having a high dielectric constant and a relatively slow reaction rate with said amines of said curing agent and said free active groups of said amine curable polymer or prepolymer.

DESCRIPTION OF THE PREFERRED EMBODIMENTS

It has been found that the use of a specific catalyst such as tributyl phosphate in combination with a curing agent utilized for curing amine curable polymers or prepolymers generally results in increased cure rates, decreased curing temperatures or both. According to the concepts of the present invention, many compounds which have a high dielectric constant and a relatively slow reaction rate generally with amines and isocyanates, as does tributyl phosphate, may also be utilized with curing agents in accordance with the concepts of the present invention.

A specific curing agent is a complex of 4,4'-methylene dianiline (MDA) and a salt. The preparation of the specific curing agent complex is set forth in U.S. Pat. No. 3,755,261, which is hereby fully incorporated by reference and specifically with respect to the formation of and the various complexes of 4,4'-methylene dianiline and a salt as well as the various complexes of racemic 2,3-Di(4-aminophenyl)butane and a salt. Generally, the complexes which are utilized as curing agents for amine curable polymers include the reaction products of 4,4'-methylene dianiline with the following salts at a ratio of about 3 moles of methylene dianiline to about 1 mole of salt; sodium chloride, sodium bromide, sodium iodide, sodium nitrite, lithium chloride, lithium bromide, lithium iodide, lithium nitrate and sodium cyanide.

Another complex which can be used as a curing agent are the reaction products of racemic 2,3-di(4-aminophenyl) butane with the following salts in approximately a ratio of 3 moles of diamine to about 1 mole of salt; sodium chloride, sodium bromide, sodium iodide, potassium chloride, potassium bromide, potassium iodide, rubidium chloride, rubidium bromide, rubidium iodide, cesium chloride, cesium bromide and cesium iodide. The complex of methylene dianiline and the salt are generally preferred with the preferred salt being sodium chloride or lithium chloride. Utilization of the preferred curing agent in the curing of amine curable prepolymers or polymers upon heating to a temperature of approximately 100° C causes methylene dianiline to be liberated from the complex and cure the polymers or prepolymers in a manner thought to be identical to that which occurs when free methylene dianiline is used as a curing agent.

The above-noted complexes can cure many amine curable prepolymers or polymers as noted and set forth in the above-noted U.S. Pat. No. 3,755,261 which is hereby fully incorporated with respect to the general and specific types of amine curable prepolymers or polymers. Generally, the preferred class of such prepolymers or polymers are the urethanes which are generally formed by the reaction of a diisocyanate and a glycol or diol having a molecular weight of generally 400 to 8,000 and preferably from 600 to 3,000. Such urethanes typically may be formed by the reaction of a polyether, a polyol, a polyester polyol, polybutadiene diols, and combinations thereof with an equivalent amount or slight excess of diisocyanate or triisocyanate to form a prepolymer having terminal isocyanate groups. The present invention pertains to such formed urethanes as well as to other formed urethanes as fully apparent to those skilled in the art. U.S. Pat. describing some general types of urethanes are Nos. 2,620,516; 2,777,831; 2,843,568; 2,866,774; 2,900,368; 2,929,800; 2,948,691; 2,948,707 and 3,141,735. Other groups of amine curable prepolymers or polymers are set forth in U.S. Pat. No. 3,755,261, are epoxy resins, polymers containing acid halide groups such as

and haloformate groups, such as

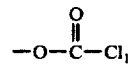

polymers containing anhydride groups which on reaction with diamines yield amide-acid linkages, halogen containing hydrocarbon polymers such as chloroprene polymers, chlorinated butyl rubber and chlorinated polyethylene and polypropylene, chlorosulfonated polymers and organopolysiloxanes.

The specific compound tributyl phosphate when used in combination with the complex curing agents has been found to have a catalytic effect in the curing of polyurethane as well as the other noted amine curable polymers or prepolymers. That is, the use of tributyl phosphate causes the various polymers or prepolymers to proceed at a more rapid cure rate or at a lower temperature than otherwise possible with solely the use of the complex curing agents. Based upon 100 parts of polymer or prepolymer, from 1.0 to approximately 35 parts of tributyl phosphate is utilized. A more preferred range extends from about 2 to about 10 parts with approximately 5 parts being highly preferred. As should be apparent to one skilled in the art, the exact amount of tributyl phosphate may vary somewhat depending upon the amount of curing agent complex utilized, the amount of polymer or prepolymer active groups, curing temperature and the like.

Other compounds which have a catalytic effect upon the curing of amine curable polymers or prepolymers according to the concepts of the present invention generally include high polar compounds, that is compounds which have a high dielectric constant, and which generally have relatively slow reaction rates with amines and free isocyanates. That is, it is desirable that the high dielectric constant catalytic compounds do not react with the free amines of the curing agent or the isocyanates or free active groups of the amine curable polymer or prepolymer but rather have a catalytic effect upon the curing agent and are not deleterious to the prepolymer. Hence, by the words "a relatively slow reaction rate" is meant a rate such that a substantial number of prepolymers are cured by the curing agents to produce cured polymers since the reaction rate of the catalytic compounds with amines or diisocyanates is sufficiently slow enough such that competitive reactions are substantially abated. Therefore high dielectric constant compounds which react with free amines such as strong acids, e.g. $H_2SO_4$, $HNO_3$, etc, primary aliphatic alcohols such as from 1 to 20 carbon atoms, and high dielectric constant compounds which react with isocyantes such as strong bases are not within the scope of the present invention. Other high dielectric constant compounds which generally readily react with the free amines and free isocyanates and therefore are not desirable are the acids of phosphorus and their esters that contain a P-H group and no strongly acidic hydrogen. Specific examples of these compounds are the phenyl phosphinic acids, the phenylphosphonic acids and the phosphines.

Generally, compounds having a high dielectric constant of 2.0 or above are preferred in the present invention. Of course, compounds having a higher dielectric constant generally have a greater catalytic effect. Generally, high dielectric catalytic compounds which are liquid during the curing temperature of the amine curable prepolymers or polymers, that is from about 80° C to about 140° C and even to about 170° C, are desirable. It is generally thought that such liquid catalytic compounds can then wet the surface of the curing agent salts and thus sufficiently produce a catalytic effect.

In addition to the compounds which react with free amines, and free isocyanates, it has now been found that a small group of compounds, namely the halogen containing foaming agents and halogen containing acids, even if they have a dielectric constant of 2.0 or above, are not suitable. These compounds are thought to attack the backbone of the polymer to be cured, especially the urethane prepolymers, and, thus produce polymers or instead, produce foaming, undesirable properties. Therefore, curing agent catalysts exclusive of or other than these compounds as well as compounds which react with free amines or free isocyanates are suitable and preferred.

Generally, typical or conventional halogen containing foaming agents are not utilized in the present invention including auxiliary blowing agents which may be included in various foam formulations to reduce the foam density. Specific examples of blowing agents include trichlorofluoromethane, dichlorodifluoromethane, and Fluorocarbon-113. Additionally, the halogen acids and specifically the inorganic halogen acids are also avoided. Specific examples of these compounds include HCl, HBr, and of course, HF.

Yet another type of halogen containing compounds undesirable in the present invention are flame retardants which, of course, contain a halogen radical. Specific examples of various flame retardant compounds are set forth in U.S. Pat. No. 3,706,821 which is hereby fully incorporated by reference, particularly with respect to the halogen containing compounds. In general, these halogen containing flame retardant compounds are avoided for the basic reason, noted above, that undesirable properties are generally produced such as poor tensiles or that foams are produced.

Outside of these few groups of specific compounds well understood to one skilled in the art, generally any catalyst having a dielectric constant of 2.0 and above may be utilized so long as the catalyst does not have an unduly reactive rate with the free amines or isocyanates.

Based upon 100 parts of polymer or prepolymer, from 0.1 to about 35 parts of the high dielectric catalyst compound is utilized. A preferred range extends from about 0.2 to about 10 parts. Of course, the exact amount of high dielectric constant catalytic compound will vary depending upon the particular desirable curing temperature as well as the curing rates of the compounds. Of course, the curing rate varies with different catalytic compounds and such effect is clearly known and understood by one skilled in the art. Representative examples of catalytic high dielectric constant compounds which are soluble in the reaction mixture include the following compounds: oleic acid, glycerine, triethyl phosphate, N-methylaniline, tributyl phosphite, DMSO (Dimethyl sulfoxide), dodecyl mercaptan, benzaldehyde, adiponitrile, nitrobenzene, cyclohexanone, N,N'dimethylbenzylamine, acetic anhydride, epon 828 (an epichlorohydrinbisphenol adduct of low molecular weight, manufactured by Shell Chemical Company), V 780 (a black pigment in a low molecular weight polyester resin base, manufactured by Ferro Chemical Company), DC 200 (a polydimethylsiloxane, manufactured by Dow Corning Chemical Company), pyridine and diethyl sulfate. Compounds which are preferred include those which generally give a demold time of less than 6.5 minutes when cured at a temperature of 120° C utilizing approximately 2.9 parts per 100 parts of polymer or prepolymer in accordance with the manner and test set forth in Example II, hereinbelow. Such preferred compounds include glycerin, triethyl phosphate, N-methylaniline, DMSO, dodecyl mercaptan, benzaldehyde, adiponitrile, nitrobenzene, cyclohexanone, N,N'-dimethylbenzylamine, acetic anhydride, low molecular weight polyester resin base containing a black pigment, polydimethylsiloxane, pyridine, diethyl sulfate, and DMF (dimethylforamide).

When the amine curable polymer or prepolymer is polyurethane, the amount of the curing agent complex will generally range from 0.8 to about 1.2 equivalents of the diamine in the curing agent to the free isocyanate groups in the polyurethane. A more preferred range extends from 1.0 to about 1.1 equivalents. These same ranges are applicable in situations wherein the polymer or prepolymer are the above-noted epoxy resins, polymers containing acid halide groups and haloformate groups, and polymers containing anhydride groups which on reaction with diamines yield amide-acid linkages. That is, the amount of curing agent complex such as methylene dianiline and a salt will have the above-noted equivalent ranges which is based upon the number of free active groups in the polymer or prepolymer which react with methylene dianiline.

Considering the remaining polymers or prepolymers, namely the halogen containing hydrocarbon polymers, the chlorosulfonated polymers and the organopolysiloxanes, since they do not generally contain diamine reactive groups on the terminal portions of the chain, a much smaller equivalent ratio is desirable to cure these compounds such as through crosslinking. Depending upon the desired final molecular weight of the polymers, and the average molecular weight of the prepolymers, the amount of curing agent complex can vary over a wide range. Generally, such a range may extend from 0.0005 to about 0.05 equivalents of the reactive portion of the curing agent such as diamine to the active groups contained in the polymer or prepolymer. A preferred range is from 0.005 to about 0.05 equivalents. As well known to one skilled in the art, the equivalent amount for obtaining a cured polymer having a desired average molecular weight or the like can be quickly and readily determined.

The composition according to the present invention can be prepared by blending the polymer or prepolymers with the curing agent complex at ambient or slightly elevated temperatures such as about 50° C but below the curing temperature of the complexed curing agent which is generally about 90° C or 100° C. Preferably, the tributyl phosphate catalyst and the other catalytic compounds having a high dielectric constant which are substantially inert or have a relatively slow reaction rate with amines and isocyanates are added just before the composition is cured such as prior to molding, extruding or the like. Since the various high dielectric constant catalytic compounds including tributyl phosphate lower the cure initiation temperature of a curing agent, preferably the polymer or prepolymer mixture is below 80° or 90° at the incorporation or blending time of tributyl phosphate and the catalytic compounds of the present invention to prevent, of course, premature cure.

Various conventional additives and compounds may be added to the composition of the present invention to impart various desirable characteristics or properties. These include antiforming agents or solid articles, pigments, light stabilizers, fillers, such as Hi Sil and the like. Additionally, in the production of polyurethanes, plasticizers are often added to increase the flexibility of the article. A conventional plasticizer often employed is dioctyl phthalate (DOP). The addition of DOP is also desirable in that since it is a liquid, it is used to disperse the powder curing agent complexes.

The tributyl phosphate catalyzed amine curable polymers or prepolymers or the other catalytic compounds having a high dielectric constant of the present invention have been found to increase the cure rate, to decrease the cure time or both. Increased rate of cure, of course, allows the use of fewer molds since each mold can be cycled more rapidly. Another important advantage of the use of the present catalyst cure systems is that because possible lower temperature cures can be effected, less thermal expansion and subsequent shrinkage occurs in a molded article. Thus, the article contains less strain and is much less likely to develop any cracks or fissures. Yet another obvious advantage is that due to the lower temperature cure of the various catalysts, lower operating costs are obtained due to energy conservation.

The amine curable prepolymers or polymers made in accordance with the present invention, can, of course, be used for the same normal applications. Concerning the preferred polyurethanes, they can be used for numerous applications such as automotive parts, bumpers, commercial and passenger tires, shoe soles, wearing apparel, roller wheels and the like. Perhaps the most important application will lie in the manufacture of tires.

The present invention will be more fully understood by reference to the following examples concerning preparation and data.

EXAMPLE I

To a 3 neck flask fitted with a stirrer, thermometer and a vacuum takeoff was added 250 grams of DuPont's Adiprene LD784 (polytetramethylene ether glycol of about 1,000 molecular weight end capped with 2 molecules of Hylene TM, i.e. approximately a 80/20 mixture the 2,4/2,6 position isomers of toluene diisocyanate) and 86.15 grams of a Caytur 21 (a complex of 4,4'-methylene dianiline and a NaCl salt) dispersion (50 percent in DOP). Then 7.15 grams of tributyl phosphate was added to a flask. The mixture was seen to rapidly thicken and set up in the flask after 3 minutes of mixing at 50° C. Cures prepared from this material were poor due to the partial cure which occured in the flask. Since it appeared that TBP catalyzed the reaction of the Caytur 21 with the prepolymers, a series of various temperature cures were run to determine if the TBP was a true catalytic material. It was found that cure would occur at temperatures down to 80° C in the catalyzed system whereas in the uncatalyzed system, a cure temperature of at least 105° C was necessary to initiate reasonable cure rates.

A series of runs were made utilizing different levels of TBP at various cure temperatures, the results of which are set forth in FIG. 1 wherein the demold time represents the time required for the molded article to be sufficiently cured such that it maintained its structural integrity upon removal from the mold. In the drawing, line 1 represents the prior art composition of 100 parts of Adiprene LD784, 20 parts of DOP and an equivalent ratio of 1.025 of the diamine to the free active isocyanate groups in the Adiprene prepolymer. The dotted portion of line 1 indicates that cures below a temperature of approximately 100° C were difficult to achieve and gave poor properties. Lines 2, 3 and 4 represent mixtures of Adiprene prepolymers, DOP, TBP, and Caytur 21 curing agent in the amounts indicated.

As readily apparent from the drawing, the addition of TBP greatly reduced the cure time at a specific curing temperature and reduced the required curing temperature to cure in a specific amount of time. The commencement of lines 2, 3 and 4 at the lower temperatures generally represent the onset of initiation or cure whereas the termination of lines 2, 3 and 4 at higher temperatures generally represent the upper desirable curing temperature. Of course, compositions containing more or less TBP will generally result in correspondingly located lines depending upon the amount of TBP. Moreover, the equivalent ratio of the complex such as methylene dianiline to free active isocyanate groups can also be varied.

The effect of tributyl phosphate concentration on physical properties is set forth in Table I.

TABLE I

PHYSICAL PROPERTIES VS. TRIBUTYL PHOSPHATE (TBP) CONCENTRAION

| COMPOSITION | A | B | C | D | E | F |
|---|---|---|---|---|---|---|
| Parts Adiprene LD784 | 100 | 100 | 100 | 100 | 100 | 100 |
| Parts Caytur 21 | 17.2 | 17.2 | 17.2 | 17.2 | 17.2 | 17.2 |
| Parts DOP | 2.8 | 17.2 | 17.2 | 17.2 | 17.2 | 17.2 |
| Parts TBP | 0 | 2.8 | 5 | 10 | 15 | 20 |
| 212° F | | | | | | |
| Tensile Str. (PSI) | 2575 | 1970 | 2050 | 2310 | 2285 | 1570 |
| 300% Mod (PSI) | 1380 | 1595 | 1530 | 1490 | 1340 | 800 |
| Crescent Tear (LB/IN) | 284 | 274 | 276 | 269 | 227 | 207 |
| 73° F | | | | | | |
| Tensile Str. (PSI) | 4880 | 5375 | 4340 | 4125 | 4050 | 2675 |
| 5% Mod (PSI) | 505 | 494 | 500 | 448 | 448 | 337 |
| 300% Mod (PSI) | 1975 | 2125 | 1875 | 1775 | 1575 | 875 |
| Crescent Tear (LB/IN) | 485 | 417 | 419 | 427 | 330 | 252 |

In general, as the amount of catalyst was increased, the physical properties such as tensile strength and crescent tear were slightly reduced. However, such reduction is generally well within the requirements of a particular application for the cured polymer. Additionally, the 5 percent and 300 percent modulus at ambient temperature (73° F) were reduced thus indicating a more resilient article is produced.

Table II shows the effect of prepolymers containing an increased amount of isocyanate content.

TABLE II

| EFFECT OF NCO CONTENT | | |
|---|---|---|
| COMPOSITION | G | H |
| Prepolymer %NCO | 6.45 | 5.10 |
| % of Caytur Cure | 102.5 | 102.5 |
| Parts TBP | 5 | 5 |
| Parts DOP | 17.2 | 14.0 |
| 212° F | | |
| Tensile Str. (PSI) | 2050 | 2100 |
| 300% Mod (PSI) | 1530 | 1020 |
| Crescent Tear (LB/IN) | 276 | 291 |
| 73° F | | |
| Tensile Str. (PSI) | 4340 | 4400 |
| 5% Mod (PSI) | 500 | 434 |
| 300% Mod (PSI) | 1875 | 1275 |
| Crescent Tear (LB/IN) | 419 | 399 |
| Tex-US Flex (Av. of two low of 8 tests) | 10,000 | 126,000 |

In general, the properties remain relatively the same except that the 5 percent and 300 percent modulus of compound G containing the higher amount of free isocyanates was much higher and the flex much lower indicating a stiffer or more brittle material.

Table III represents polyurethane compositions prepared from poly THF (Tetrahydrofuran) with different toluene diisocyanate isomer blends.

TABLE III

| PREPOLYMER TYPES | | |
|---|---|---|
| COMPOSITION | I | J |
| Prepolymer type | Poly THF | Poly THF |
| TDI type | Hylene TM | Hylene T |
| % Caytur Cure | 102.5 | 102.5 |
| Parts DOP | 17.1 | 20 |
| Parts TBP | 2.9 | 5 |
| 212° F | | |
| Tensile Str. (PSI) | 1970 | 1890 |
| 300% Mod. (PSI) | 1560 | 800 |
| Crescent Tear (LB/IN) | 274 | 137 |
| 73° F | | |
| Tensile Str. (PSI) | 5375 | 2075 |
| 5% Mod. (PSI) | 494 | 168 |
| 300% Mod. (PSI) | 2125 | 890 |
| Crescent Tear (LB/IN) | 417 | 269 |

Additionally, the various catalytic high dielectric constant compounds according to the present invention other than tributyl phosphate also give reduced cure time at a specific curing temperature or reduced the required curing temperature to cure in a specific amount of time. Moreover, the properties of the amine curable polymers or prepolymers according to the present invention wherein various high dielectric catalytic compounds were utilized generally are the same as polymers or prepolymers cured without said high dielectric catalytic compounds.

The present invention will be more fully understood by reference to the following example and data.

EXAMPLE II

To a three neck flask fitted with a stirrer, thermometer and a vacuum takeoff was added 250 grams of DuPont's Adiprene LD784 (polytetramethylene ether glycol of about 1,000 molecular weight end capped with two molecules of Hylene TM, that is, approximately an 80/20 mixture of the 2,4/2,6 position isomers of toluene diisocyanate) and 86.15 grams of Caytur 21 (the complex of 4,4'-methylene dianiline and a salt) dispersion (50% in DOP). The mixture was heated to 50° C and then 7.15 grams of various high dielectric constant catalytic compounds was added with constant stirring. The mixture was then stirred more or less from about one half minute to a minute and a half depending upon the catalytic effect of a specific high dielectric constant compound. The mixture was then poured into a mold. The time necessary for the material to become demoldable, that is maintain a structural integrity which would not lose its shape after separation from a mold, was compared to an uncatalyzed mixture to determine whether the specific compound was a true catalyst. The following Table sets forth the results of a number of various types of high dielectric constant compounds which were tested as catalysts. It was found that the catalyzed systems could be cured as low as about 80° C whereas in the absence of a catalyst, cure temperature of at least 105° C was necessary to initiate reasonable cure rates.

Table IV sets forth the mold time of various catalysts wherein an amount of 2.9 grams per 100 grams of prepolymer were utilized and the mixture cured at a temperature of 120° C.

TABLE IV

| SAMPLE | CATALYST | MOLD TEMP (° C) | DEMOLD TIME (MI) |
|---|---|---|---|
| Control | DOP | 120 | 10.0 |
| A | Glycerine | 120 | 1.0 |
| B | Triethyl phosphate | 120 | 5.0 |
| C | N-methylaniline | 120 | 4.5 |
| D | Tributyl phosphite | 120 | 8.0 |
| E | Oleic Acid | 100 | 7.5 |
| F | Dimethylsulfoxide | 120 | 0.8 |
| G | Dodecyl mercaptan | 120 | 5.0 |
| H | Benzaldehyde | 120 | 5.0 |
| I | Adiponitrile | 120 | 3.0 |
| J | Nitrobenzene | 120 | 6.0 |
| K | Cyclohexanone | 120 | 3.5 |
| L | N,N'-dimethylbenzylamine | 120 | 6.0 |
| M | Acetic Anhydride | 120 | 6.0 |
| N | Epon 828 | 120 | 6.5 |
| O | V 780 | 120 | 5.0 |
| P | DC 200 | 120 | 5.5 |
| Q | Pyridine | 120 | 3.0 |
| R | Diethyl sulfate | 120 | 4.5 |
| S | DMF | 120 | 1.0 |

Of course, increased concentrations of a specific catalyst will result in increased cure rates and thus shorter demold times and/or lower curing temperatures. Variation of concentrations, cure temperature and demold time of the catalysts of the present invention when plotted will result in a graph similar to FIG. 1.

Table V represents polyurethane compositions prepared from polypropylene glycol.

TABLE V

| Parts, Wt. | Compound |
|---|---|
| 100 | Polypropylene glycol-Hylene TM prepolymer (6.2% NCO) |
| 32.9 | Caytur 21 Dispersion (49.5% in DOP) |
| 2.9 | Oleic Acid |

The composition of Table V when cured according to the same conditions as the compositions set forth in Table IV gave a demold time of 4.0 minutes.

While in accordance with the patent statutes, the preferred embodiments have been illustrated and described in detail, it is to be understood that the invention is not limited thereto, the scope of the invention being measured solely by the scope of the attached claims.

What is claimed is:

1. A mixture of a catalyst curable polymer, comprising,
   100 parts by weight of an amine curable urethane polymer or prepolymer containing free isocyanate groups,
   from 0.8 to 1.2 equivalents of an amine containing curing agent based upon the free active groups of said amine curable polymer or prepolymer, said curing agent selected from a group consisting of a complex of 4,4'-methylene dianiline and a salt, said salt selected from the group consisting of sodium chloride, sodium bromide, sodium iodide, sodium nitrate, lithium chloride, lithium bromide, lithium iodide, lithium nitrate and sodium cyanide, and a complex of racemic 2,3-di(4-aminophenyl) butane and a salt, said salt selected from the group consisting of sodium chloride, sodium bromide, sodium iodide, potassium chloride, potassium bromide, potassium iodide, rubidium chloride, rubidium bromide, rubidium iodide, cesium chloride, cesium bromide and cesium iodide, the ratio of said dianiline or said butane to said salt in said complex being about 3 moles per 1 mole, and
   from 0.1 to about 35 parts of a curing agent catalyst having a high dielectric constant selected from the class consisting of oleic acid, benzaldehyde, adiponitrile, acetic anhydride, polydimethylsiloxane and diethyl sulfate.

2. A catalyst cured polymer according to claim 1, wherein said curing agent is a complex of 4,4'-methylene dianiline and a salt.

3. A catalyst cured polymer according to claim 2, said catalyst has a dielectric constant of 2.0 and greater.

4. A catalyst cured polymer according to claim 3, wherein said salt of said dianiline complex is selected from the group consisting of sodium chloride and lithium chloride.

5. A catalyst cured polymer according to claim 4, wherein said equivalent ratio of said curing agent to said free active groups of said amine curable polymer or prepolymer ranges from 1.0 to about 1.1 and said amount of said high dielectric constant catalysts range from about 0.2 to about 10 parts.

6. A process for the catalytic curing of an amine polymer or prepolymer comprising, the steps of,
   adding to 100 parts by weight of a urethane polymer or prepolymer containing free isocyanate groups, from 0.8 to 1.2 equivalents of an amine containing curing agent based upon the free active groups of said amine curable polymer or prepolymer, said curing agent selected from a group consisting of a complex of 4,4'-methylene dianiline and a salt, said salt selected from the group consisting of sodium chloride, sodium bromide, sodium iodide, sodium nitrate, lithium chloride, lithium bromide, lithium iodide, lithium nitrate and sodium cyanide, and a complex of racemic 2,3-di(4-aminophenyl) butane and a salt, said salt selected from the group consisting of sodium chloride, sodium bromide, sodium iodide, potassium chloride, potassium bromide, potassium iodide, rubidium chloride, rubidium bromide, rubidium iodide, cesium chloride, cesium bromide and cesium iodide, the ratio of said dianiline or said butane to said salt in said complex being about 3 moles per 1 mole, and
   from 0.1 to about 35 parts of a curing agent catalyst having a high dielectric constant selected from the class consisting of oleic acid, benzaldehyde, adiponitrile, acetic anhydride, and polydimethylsiloxane, and
   curing said urethane polymer or prepolymer composition.

7. A process according to claim 6, wherein said curing agent is a complex of 4,4'-methylene dianiline and a salt.

8. A process according to claim 7, wherein said catalyst has a dielectric constant of 2.0 and greater.

9. A process according to claim 8, wherein said salt of said dianiline complex is selected from the group consisting of sodium chloride, and lithium chloride.

10. A process according to claim 9, wherein the amount of said high dielectric constant catalysts ranges from about 0.2 to about 10 parts and said equivalent ratio of said curing agent to said free active groups of said amine curable polymer or prepolymer ranges from 1.0 to about 1.1.

11. A process according to claim 10, wherein said curing is conducted at a temperature from about 80° C to about 140° C.

* * * * *